(12) United States Patent
Schaefer

(10) Patent No.: US 10,544,725 B2
(45) Date of Patent: Jan. 28, 2020

(54) THERMAL MANAGEMENT VALVE MODULE WITH CONCENTRIC SHAFTS FOR ROTARY VALVE CONTROL

(71) Applicants: Schaeffler Technologies AG & Co. KG, Herzogenaurach (DE); Schaeffler Group USA, INc., Fort Mill, SC (US)

(72) Inventor: Peter Schaefer, Brownstown, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 183 days.

(21) Appl. No.: 14/818,408

(22) Filed: Aug. 5, 2015

(65) Prior Publication Data

US 2016/0040585 A1 Feb. 11, 2016

Related U.S. Application Data

(60) Provisional application No. 62/033,160, filed on Aug. 5, 2014.

(51) Int. Cl.
| | | |
|---|---|---|
| *F01P 7/16* | (2006.01) | |
| *F01P 3/20* | (2006.01) | |
| *G05D 7/06* | (2006.01) | |

(52) U.S. Cl.
CPC .................. *F01P 7/16* (2013.01); *F01P 3/20* (2013.01); *G05D 7/0641* (2013.01)

(58) Field of Classification Search
CPC .............. F02M 13/046; F16K 11/0853; F16K 11/0856; F16K 11/165; F01P 7/14; F01P 2007/146; G05D 7/0641

(Continued)

(56) References Cited

U.S. PATENT DOCUMENTS 30,485 A * 10/1860 Letellier ............... F16K 11/202
137/637.3
1,990,773 A 11/1932 Boynton
(Continued)

FOREIGN PATENT DOCUMENTS

DE 835578 C 5/1952
DE 3621553 A1 1/1988
(Continued)

OTHER PUBLICATIONS

Extended European Search Report dated May 9, 2018.

*Primary Examiner* — Craig M Schneider
*Assistant Examiner* — Angelisa L. Hicks
(74) *Attorney, Agent, or Firm* — Volpe and Koenig, P.C.

(57) ABSTRACT

A thermal management valve module is provided which includes a housing with at least one flow chamber. First and second valve bodies are rotatably positioned in the housing, and control the opening and closing of ports located on the housing. The first and second valve bodies include fluid pathways that allow flow through the first port and second port, dependent upon rotational positions of the valve bodies. First and second actuator shafts extend in the housing, the second actuator shaft is hollow and the first actuator shaft extends, preferably concentrically, through the second actuator shaft. The first valve body is rotationally fixed to the first actuator shaft and the second valve body is rotationally fixed to the second actuator shaft allowing separate positioning of the first and second valve bodies.

14 Claims, 2 Drawing Sheets

(58) Field of Classification Search
USPC .................................. 137/554, 594; 123/336
See application file for complete search history.

(56) References Cited

U.S. PATENT DOCUMENTS

| | | | | |
|---|---|---|---|---|
| 3,595,270 | A * | 7/1971 | McNeal, Jr. | .......... F16K 11/202 137/575 |
| 4,073,278 | A * | 2/1978 | Glenn | .................. F02M 13/046 123/198 F |
| 5,247,964 | A | 9/1993 | DeLange | |
| 5,269,347 | A * | 12/1993 | Beasley | ................ F16K 11/163 137/607 |
| 5,518,028 | A * | 5/1996 | Walker | ................ F16K 37/0033 137/554 |
| 6,028,384 | A * | 2/2000 | Billman | ............. B60H 1/00835 251/129.11 |
| 6,371,060 | B1 | 4/2002 | Lehmann et al. | |
| 6,539,899 | B1 | 4/2003 | Piccirilli et al. | |
| 7,267,139 | B2 * | 9/2007 | Blomquist | ............ F02D 9/1065 123/568.24 |
| 8,807,096 | B2 | 8/2014 | Traudt | |
| 8,931,372 | B2 * | 1/2015 | Reifer | ..................... E06B 7/092 160/168.1 P |
| 2002/0047050 | A1 | 4/2002 | Leu et al. | |
| 2006/0102865 | A1 | 5/2006 | Pervaiz | |
| 2010/0126594 | A1 | 5/2010 | Sheppard | |
| 2010/0282190 | A1 | 11/2010 | Stoermer | |
| 2011/0073064 | A1 * | 3/2011 | Mavinahally | ............. F01L 1/02 123/195 R |

FOREIGN PATENT DOCUMENTS

| | | | |
|---|---|---|---|
| DE | 102006055536 | 6/2008 | |
| DE | 112014003408 T5 * | 4/2016 | ......... F16K 11/0876 |
| FR | 2945105 A1 | 11/2010 | |
| WO | 2010012563 | 2/2010 | |

* cited by examiner

THERMAL MANAGEMENT VALVE MODULE WITH CONCENTRIC SHAFTS FOR ROTARY VALVE CONTROL

INCORPORATION BY REFERENCE

The following documents are incorporated herein by reference as if fully set forth: U.S. Provisional Application No. 62/033,160, filed Aug. 5, 2014.

FIELD OF INVENTION

The invention relates to thermal management systems used to direct coolant flows in vehicles, particularly for direction of coolant fluid flows in connection with the engine and various other systems in motor vehicles.

BACKGROUND

In automotive applications, there is a push for energy efficiency. One way to increase efficiency of motor vehicles is to control the coolant flows to and from the internal combustion engine so that the engine operates at a peak operating temperature. It has been known to use switchable coolant pumps so that the coolant flow is switched off while the engine heats up from a cold start more quickly. Additionally, throttling of coolant flows is also known using a thermal management module; however, the known thermal management module valves only include provisions for providing the coolant at a single outlet temperature.

One known prior art valve used in connection with a thermal management system is disclosed in DE 10 2006 055 536. In this case, a rotary valve having two coaxial rotary valve bodies located within a housing are provided. Here the inlet is in an axial direction and, depending upon the location of the coaxial valve bodies, the coolant flow is directed to a first or second outlet that can be separately switched off and on in order to control the flow of coolant from the water pump to various heat exchangers used in connection with the engine and various other systems, such as an oil cooler. However, there is no possibility for providing different outlet temperatures from the device.

It would be desirable to provide a way for allowing coolant at different temperatures to be available to different motor vehicle systems and engine components. It would also be desirable to achieve this in a cost efficient manner within a minimum space requirement. It would also be desirable to control the position of the rotary valve bodies within such valves in defined and efficient manner.

SUMMARY

Briefly stated, a thermal management valve module is provided which includes a housing with at least one flow chamber located therein. A first valve body is rotatably positioned in the housing, and controls the opening and closing of a first port located on the housing. A second valve body is rotatably positioned in the housing and controls the opening and closing of a second port located on the housing. The first valve body includes a fluid pathway that allows flow through the first port in a first rotational position, prevents flow from the first port in a second rotational position, and throttles the flow from the first port in an intermediate position. The second valve body includes a fluid pathway that allows flow through the second port in a first rotational position of the second valve body, prevents flow from the second port in a second rotational position of the second valve body, and throttles the flow from the second port in an intermediate position of the second valve body. First and second actuator shafts extend in the housing, the second actuator shaft is hollow and the first actuator shaft extends, preferably concentrically, through the second actuator shaft. The first valve body is rotationally fixed to the first actuator shaft and the second valve body is rotationally fixed to the second actuator shaft.

In one preferred arrangement, an isolating wall is located in the housing that separates the housing into a first flow chamber and a second flow chamber, and the first valve body is located in the first flow chamber and the second valve body is located in the second flow chamber.

In one preferred arrangement, a first rotary actuator is connected via a first connection to the first shaft and a second rotary actuator is connected via a second connection to the second shaft.

In one preferred arrangement, the first actuator shaft extends beyond both ends of the second actuator shaft, and a first end of the first actuator shaft is supported in a bearing in the housing.

In one preferred arrangement, the second ends of the first and second actuator shafts extend outside of the housing for connection to separate actuators.

In one preferred arrangement, the first port is a first inlet port that connects to the first flow chamber, and an additional port, which is preferably a first outlet port is located on the housing that connects to the first flow chamber. The second port is a second inlet port that connects to the second flow chamber, and a second additional port, which is a second outlet port is located on the housing that connects to the second flow chamber. The first valve body includes a fluid pathway that connects the first inlet port to the first outlet port in the first rotational position, prevents flow from the first outlet port in the second rotational position, and throttles the flow from the first inlet port to the first outlet port in an intermediate position. The second valve body includes a fluid pathway that connects the second inlet port and the second outlet port in a first rotational position of the second valve body, prevents flow from the second outlet port in a second rotational position of the second valve body, and throttles the flow from the second inlet port to the second outlet port in an intermediate position of the second valve body.

In one aspect of the invention, an additional port, which can be an additional inlet port, is located on the housing and connects to the first flow chamber, and the first valve body is rotatably movable in the first flow chamber to a third rotational position in which the fluid pathway connects the additional inlet port with the first flow chamber, and the first valve body is rotatably movable to a second intermediate position to provide a flow path from the first port and the additional port which allows the flows to mix in the first chamber and the mixed first chamber flow is delivered to a first outlet port connected to the first chamber. This allows controlled mixing of, for example, coolant fluid at different temperatures so that the temperature of the coolant fluid delivered by the first outlet can be at a first temperature.

In another aspect, an additional port, which can be an inlet port, is also located on the housing and connects to the second flow chamber. The second valve body is rotatably movable in the second chamber to a third rotational position in which the fluid pathway connects the additional inlet port of the second flow chamber and the second outlet port. The second valve body is also rotatably movable to a second intermediate position to provide a flow path from the second inlet port and the additional inlet port of the second flow chamber which allows the inlet flows to mix in the second chamber and the mixed second chamber flow is delivered to the second outlet port. This allows controlled mixing of, for example, coolant fluid at different temperatures so that the temperature of the coolant fluid delivered by the second outlet port can be at a second temperature, independently controlled from the first temperature.

Positioning sensors are preferably provided for the first and second actuator shafts in order to control the positions of the valve bodies.

These arrangements are particularly useful as thermal module control valves for use in connection with a motor vehicle engine cooling system. The system can also be used for an electric vehicle or a hybrid vehicle where the heat source can be the battery pack which also requires cooling, and cooling fluid at different temperatures can be provided for cooling the battery pack and the passenger compartment heat exchanger.

In another aspect, a method of operating a thermal management valve is provided, which includes providing thermal management valve module according to one of the embodiments discussed above, rotating the first actuator shaft to position the first valve body, and independently rotating the second actuator shaft about the first actuator shaft to position the second valve body.

In another aspect of the method, a first actuator is connected to the first actuator shaft and a second actuator is connected to the second actuator shaft, and the rotating of the first actuator shaft is carried out by the first actuator, and the rotating of the second actuator shaft is carried out by the second actuator.

In another aspect of the method, first and second position sensors are associated with the respective first and second actuator shafts, and the position sensors are connected to a controller and the actuators are connected to the controller, and the controller adjusts a position of the first and second valve bodies independently.

In another aspect of the method, the thermal management valve is connected to a coolant system in a motor vehicle, and the controller, which can be an ECM, adjusts the position of the first valve body and the second valve body in order to separately control coolant flows from the thermal management valve.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
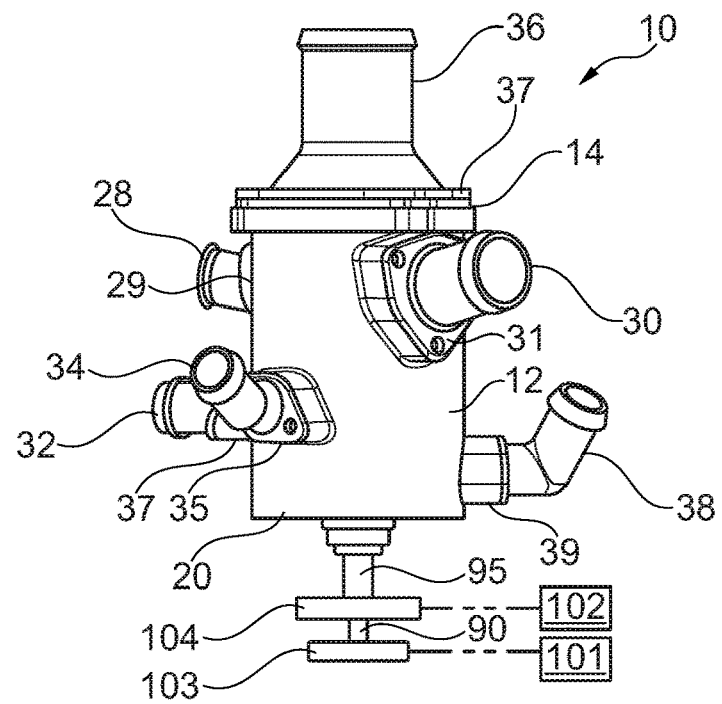
FIG. 1 is an elevational view of a first embodiment of a thermal management valve module according to the invention.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
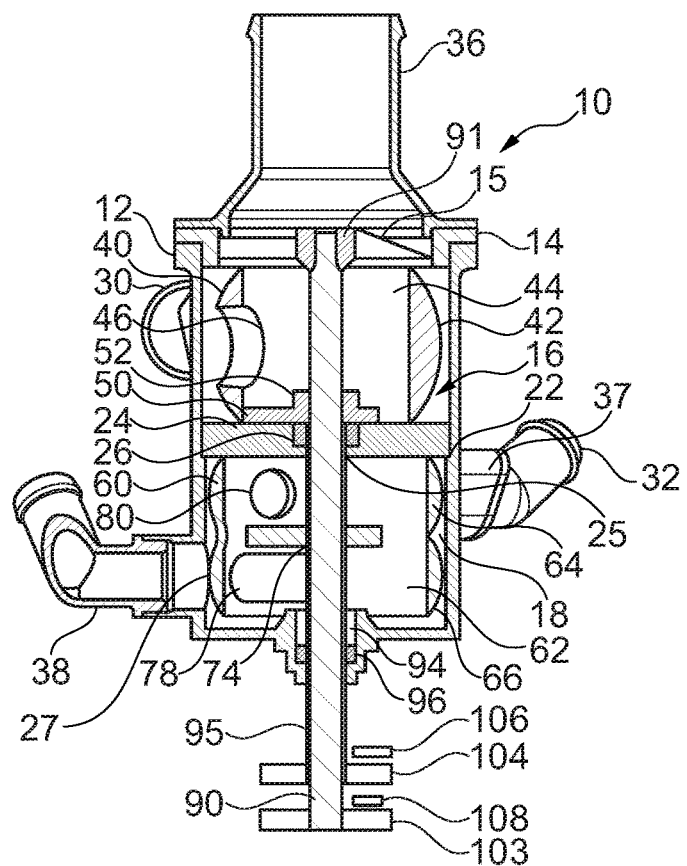
FIG. 2 is a cross-sectional view through the thermal management valve module of FIG. 1.

Referring now to FIGS. 1-2, a first embodiment of a thermal management valve module 10 is shown. As shown in FIG. 1, the valve module 10 includes a valve housing 12 formed with a preferably cylindrical housing wall 20 having a base 21 with a centering feature. An upper end of the valve housing 12 is preferably closed via an end cover 14 having arms 15 which support a center support 91 for a first actuator shaft 90 shown in detail in FIG. 2, which is discussed in detail below. The housing 12 is preferably divided into a first flow chamber 16 and a second flow chamber 18 by an isolating wall 24. In a preferred embodiment, the isolating wall 24 is a separate disk that is seated on a shoulder 22 formed on an inside of the housing wall 20. This isolating wall 24 can be seated with a seal, if desired. Additionally, it can be formed of an insulating material in order to provide thermal insulation between the first and second flow chambers 16, 18.

As shown in FIG. 2, the isolating wall 24 includes an opening 25 through which the first actuator shaft 90 extends. A second actuator shaft 95, which is preferably hollow and extends through the first actuator 90, preferably also extends into the opening 25. A seal 26 can be pressed in the opening 25 in order to provide sealing against the second actuator shaft 95.

As shown in detail in FIG. 1, a plurality of inlet and outlet ports are connected to the housing 12. A first port, which is preferably a first inlet port 28, is located on the housing 12 and connects to the first flow chamber 16. Preferably, the first inlet port 28 is connected to the housing 12 via a mounting flange 29. This can be welded, screwed, adhered or otherwise connected to the valve housing 12. An additional port 30, preferably an additional inlet port, is preferably located on the valve housing 12 that connects to the first flow chamber 16. This additional inlet port 30 is also connected to the valve housing 12 via a mounting flange 31. A first outlet port 36 is preferably also located on the valve housing 12 that connects to the first flow chamber 16. This is connected via a flange 37, shown in FIG. 1, which can be placed over the end disk 14 and can be sealed in position via a gasket or sealing material. The mounting flanges 29, 31, 37 can be connected via screws, welding, adhesive, or any other suitable means.

A second port 32, preferably a second inlet port, is located on the valve housing 12 and connects to the second flow chamber 18. Preferably an additional port 34, preferably an additional inlet port 34, is also located on the valve housing 12 and connects to the second flow chamber 18. A second outlet port 38 is located on the valve housing 12 and connects to the second flow chamber 18. The second inlet port 32, the additional inlet port 34, as well as the second outlet port 38 are preferably connected via respective mounting flanges 33, 35, 39 to the housing wall 20 of the valve housing 12. The mounting flanges 33, 35, 39 can be connected via screws, welding, adhesive, or any other suitable means.

Referring to FIG. 2, a first valve body 40 is rotatably positioned in the first flow chamber 16. The first valve body 40 is preferably a spheroid body having an outer surface 42 defined in cross-section by a curved shape that remains constant as it extends in a peripheral direction about a rotational axis. The inlet and outlet port openings in the housing 12 that engage the spheroid body forming the first valve body 40 have a complementary sealing seat or seal 27 located around the respective inlet and outlet ports that engage the spheroid body. The valve body 40 preferably has a hollow center 44. A fluid pathway is defined through the first valve body 40 that connects the first inlet port 28 to the first flow chamber 16, and preferably to the first outlet port 36 in a first rotational position of the first valve body 40, and that prevents flow from the first outlet port 36 in a second rotational position of the first valve body 40. Preferably the first valve body 40 throttles the flow from the first inlet port 28 to the first outlet port 36 in an intermediate position. The first valve body 40 has a fluid opening 46 defined through the valve body wall to the hollow center 44. Preferably at least one support web 50 extends from the outer wall of the valve body 40 to a center shaft connection 52 for a rotationally fixed connection to the first actuator shaft 90. The opening 46 in the valve body 40 can connect one or both of the first inlet port and additional inlet port 28, 30 to the first outlet port 36 via the hollow center 44 and the spaces between the arms 15 of the end disk 14. The first valve body 40 is preferably rotatably movable in the first flow chamber to a third rotational position in which the fluid pathway connects the additional inlet port 30 and the first outlet port 36, as well as to a second intermediate position in which the flow from the first inlet port 28 and the additional inlet port 30 is mixed in the first flow chamber 16 and delivered to the first outlet port 36. The second intermediate position is controllable by rotatable movement of the first valve body 40 so that the proportion of flow from the first inlet port 28 and the additional inlet port 30 is controlled so that, for example, a volume of fluid at a first temperature from the first inlet port 28 is proportionally adjustable relative to a volume of fluid at a second temperature from the additional inlet port 30 so that a desired temperature fluid is delivered to the first outlet port 36.

Still with reference to FIG. 2, a second valve body 60 is rotatably positioned in the second chamber 18. The second valve body 60 includes a fluid pathway that connects the second inlet port 32 to the second flow chamber 18, and preferably to the second outlet port 38 in a first rotational position of the second valve body 60. The second valve body 60 is rotatable to a second rotational position that prevents flow from the second outlet port 38. Additionally, the second valve body 60 is movable to an intermediate position in which the flow from the second inlet port 32 to the second outlet port 38 is throttled. Preferably, the second valve body 60 is also formed as a spheroid body and the inlet and outlet ports in the housing 12 that engage the second valve body 60 have complementary sealing seats or seals 27 located around the respective inlet and outlet port openings that engage the spheroid body. Preferably, the second valve body 60 includes a first part spheroid outer surface 64 and a second part spheroid surface 66, with the first part spheroid surface 64 being aligned with the opening in the valve housing for the second and additional inlet ports 32, 34 and a second part spheroidal surface being aligned with the second outlet port 38. The valve body 60 preferably has a hollow center 62 and the wall of the valve body 60 includes an elongated inlet opening 78 as well as an outlet opening 80. A support web 74 preferably extends from the valve body wall to a center area and engages the second actuator shaft 95 in a rotationally fixed manner.

Preferably, the second valve body 60 is rotatably movable in the second chamber 18 to a third rotational position in which the fluid pathway connects the additional inlet port 34 of the second flow chamber 18 and the second outlet port 38. Additionally, the second valve body 60 is movable to a second intermediate position of the second valve body 60 in which the flow from the second inlet port 32 and the additional inlet port 34 of the second flow chamber 18 is mixed in the second flow chamber 18 and is delivered to the second outlet port 38. This allows a mixture of flows from the second inlet 32 and fourth inlet 34 to be mixed depending upon a rotational position of the second valve body 60 allowing for example, a specific temperature of the fluids being transferred through the thermal management valve module 10 to be controlled in a similar manner as discussed above in connection with the first valve body 40 in the first flow chamber 16.

Due to the isolated arrangement of the first flow chamber 16 and the second flow chamber 18, two different outlet temperatures can be provided from the outlets 36 and 38 of the first and second flow chambers 16, 18.

Those skilled in the art will recognize that a plurality of isolated flow chambers 16, 18, etc. can be provided, if desired. Each of these flow chambers can have a plurality of inlet ports and/or outlet ports in order to allow different flow controls. Alternatively, the isolation wall 24 can be omitted so that the first and second valve bodies 40, 60 are in a single flow chamber.

Still with reference to FIG. 2, the first and second actuator shafts 90, 95 extend axially through the bottom of the valve housing 12, with the first actuator shaft 90 being rotatable inside the second actuator shaft 95, preferably arranged concentrically therewith. A rotary seal can be provided between the first and second actuator shafts 90, 95, if desired. The first end of the first actuator shaft 90 is supported via an upper support bearing 91 in the housing 12. The first actuator shaft 90 is also supported by the inside of the hollow second actuator shaft 95 and can also be supported at the connection 103 for the first actuator 101. The second actuator shaft 95 is supported at the bearing/seal 26 in the isolating wall 24 and by a lower bearing 94 at the bottom of the housing 12. The lower bearing 94 can also provide a sealing function to seal against the lower end of the second actuator shaft 95. Alternatively, a separate seal 96 can be provided. A second rotary actuator 102 is connected to the second actuator shaft 95 by a connection 104. The connections 103, 104 can be gears, pulleys, levers, or even a direct drive from a rotary actuator shaft. The first valve body 40 is directly connected to the first actuator shaft 90 and the second valve body 60 is directly connected to the second actuator shaft 95 which allows for separate adjustment of the valve bodies 40, 60 at the same time using the first and second actuators 101, 102. A single actuator would also be possible that is releasably connected to the first and second connections 103, 104 so that it can separately drive either of the actuator shafts 90, 95.

Referring again to FIG. 2, a position sensor 106, 108 is preferably provided for each of the actuator shafts 90, 95, or can be provided directly in the actuators 101, 102 as shown in FIG. 1. The rotary position sensors 106, 108 are located along each of the actuator shafts 90, 95 or at the connections 103, 104 so that the positions of both valve bodies 40, 60 can be determined.

Figure 3:
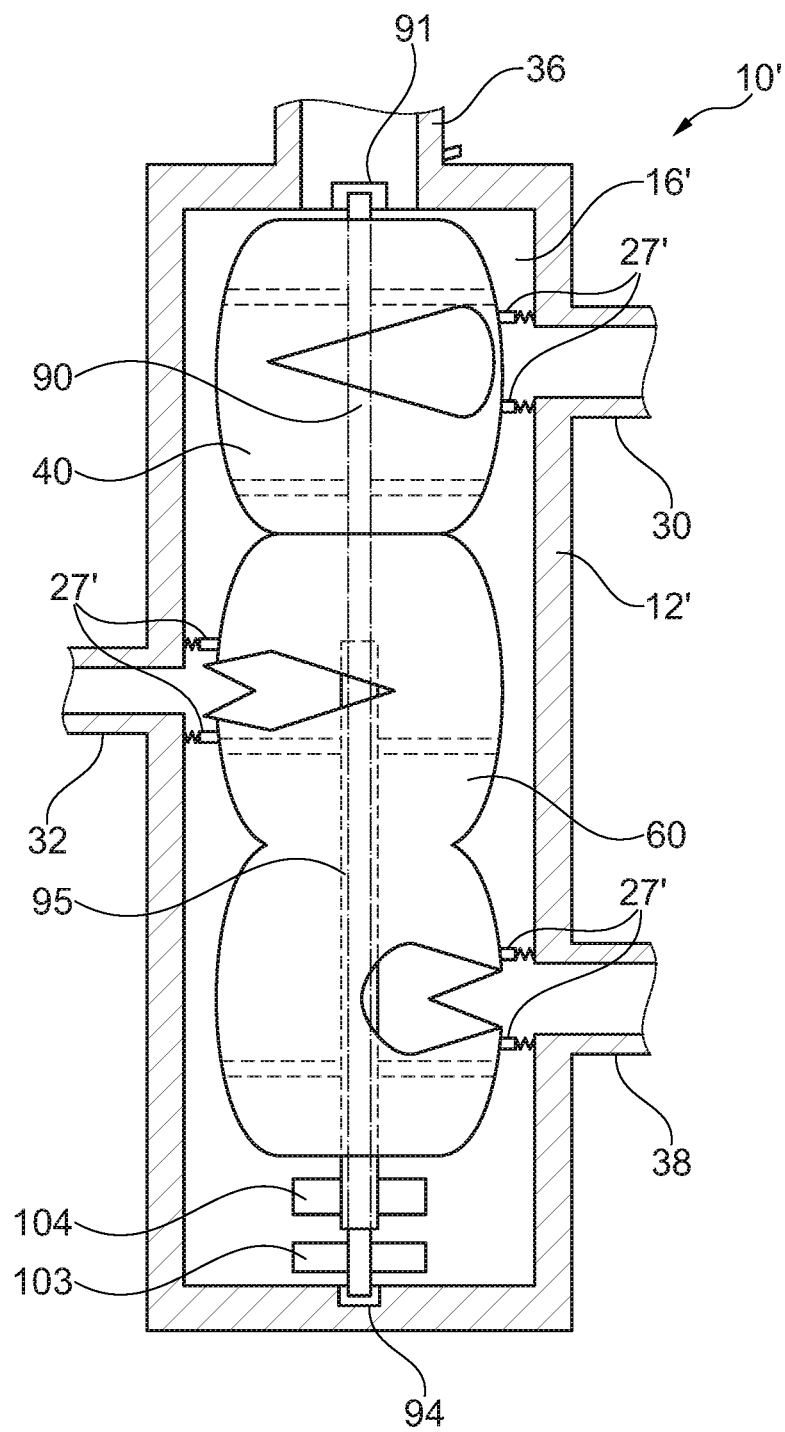
FIG. 3 is a schematic cross-sectional view through a second embodiment of a thermal management valve module.

Referring now to FIG. 3, a second embodiment of a thermal management valve module 10' is shown. The second embodiment of the thermal management valve module 10' is similar to the first embodiment 10 discussed above, and like elements are identified with the same reference numbers. The differences are that there is only a single flow chamber 16' for the first and second valve bodies 40, 60, and the first actuator shaft 90 is supported in a lower bearing 94, in the bottom wall of the housing 12' so that both the first and second ends of the first actuator shaft 90 are supported in bearings 91, 94 in the housing 12'. The connections 103, 104 to the first and second actuator shafts 90, 95 are located within the housing 12'. An isolating wall can be provided in order to separate the connections 103, 104 from the flow chamber 16', if desired.

Functionally, operation of both the first and second embodiments of the thermal management valve module 10, 10' is the same, with first and second actuator shafts 90, 95 being concentric, and being controlled by separate actuators via the respective connections 103, 104 to the first and second actuator shafts 90, 95 in order to directly position the first and second valve bodies 40, 60 independently from one another. Due to the isolating wall 24 creating first and second flow chambers 16, 18, the first valve module 10 has the further benefit of being able to provide outputs at two different temperatures.

Having thus described the exemplary embodiments of the invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A thermal management valve module, comprising:
    a housing with at least one flow chamber;
    a first port and a second port on the housing;
    a first valve body rotatably positioned in the at least one flow chamber, the first valve body including a fluid pathway that, in a first rotational position, connects the first port to the at least one flow chamber, and in a second rotational position, prevents flow from the first port, and in an intermediate position, throttles the flow from the first port to the at least one flow chamber;
    a second valve body rotatably positioned in the at least one flow chamber, the second valve body including a fluid pathway that in a first rotational position of the second valve body connects the second port to the at least one flow chamber, and in a second rotational position of the second valve body, prevents flow from the second port, and in an intermediate position of the second valve body throttles the flow from the second port;
    first and second actuator shafts extend in the housing, the second actuator shaft is hollow and the first actuator shaft extends through the second actuator shaft, the first valve body is rotationally fixed to the first actuator shaft and the second valve body is rotationally fixed to the second actuator shaft in order to allow independent rotation of the first and second valve bodies;
    at least one of the first or second ports is configured with a seal that engages at least one of the valve bodies; and
    an isolating wall located in the housing that separates the housing into a first flow chamber and a second flow chamber that are isolated from one another, the first flow chamber having the first valve body and the second flow chamber having the second valve body,
    wherein the first port is a first inlet port that connects to the first flow chamber, and the second port is a second inlet port that connects to the second flow chamber,
    wherein the intermediate position of the second valve body allows a mixture of flows from the second inlet port and an additional inlet port.

2. The thermal management valve module of claim 1, wherein the second actuator shaft is concentric to the first actuator shaft.

3. The thermal management valve module of claim 1, further comprising a first outlet port of the housing that connects to the first flow chamber, and a second outlet port of the housing that connects to the second flow chamber, wherein a rotational position of the first valve body controls a flow from the first flow chamber and a rotational position of the second valve body controls a flow from the second flow chamber.

4. The thermal management valve module of claim 1, wherein first and second position sensors are located on the respective first and second actuator shafts.

5. The thermal management valve module of claim 1, wherein the first actuator shaft extends beyond both ends of the second actuator shaft, and a first end of the first actuator shaft is supported in a bearing in the housing.

6. The thermal management valve module of claim 1, wherein second ends of the first and the second actuator shafts extend outside of the housing for connection to separate actuators.

7. The thermal management valve module of claim 1, wherein a first actuator is connected to the first actuator shaft and a second actuator is connected to the second actuator shaft.

8. The thermal management valve module of claim 1, wherein the first actuator shaft extends beyond both ends of the second actuator shafts, and first and second ends of the first actuator shaft are supported in bearings in the housing.

9. The thermal management valve module of claim 1, wherein the first or second valve body is formed as a spheroid body.

10. The thermal management valve module of claim 1, wherein the first valve body has a hollow center defining part of the respective fluid pathway and through which the first actuator shaft extends, and the second valve body has a hollow center defining part of the respective fluid pathway and through which the first and second actuator shafts extend.

11. The thermal management valve module of claim 1, wherein the intermediate position of the first valve body allows a mixture of flows from the first inlet port and a third inlet port.

12. The thermal management valve module of claim 1, further comprising a first outlet port of the housing that connects to the first flow chamber, and a second outlet port of the housing that connects to the second flow chamber, wherein a rotational position of the first valve body controls a flow from the first flow chamber and a rotational position of the second valve body controls a flow from the second flow chamber,
    wherein the intermediate position of the first valve body throttles flow to the first outlet port, and the intermediate position of the second valve body throttles flow to the second outlet port.

13. A method of operating a thermal management valve, comprising:
 providing thermal management valve module including a housing with two flow chambers that are isolated from one another, a first port and a second port on the housing, a first valve body rotatably positioned in a first flow chamber, the first valve body including a fluid pathway that, in a first rotational position, connects the first port to the first flow chamber, and in a second rotational position, prevents flow from the first port, and in an intermediate position, throttles the flow from the first port to the first flow chamber, a second valve body rotatably positioned in a second flow chamber, the second valve body including a fluid pathway that in a first rotational position of the second valve body connects the second port to the second flow chamber, and in a second rotational position of the second valve body, prevents flow from the second port, and in an intermediate position of the second valve body throttles the flow from the second port, and first and second actuator shafts extend in the housing, the second actuator shaft is hollow and the first actuator shaft extends through the second actuator shaft, the first valve body is rotationally fixed to the first actuator shaft and the second valve body is rotationally fixed to the second actuator shaft, wherein at least one of the first or second inlet ports or first or second outlet ports is configured with a seal that engages at least one of the valve bodies;
 rotating the first actuator shaft to position the first valve body;
 independently rotating the second actuator shaft about the first actuator shaft to position the second valve body,
 connecting a first actuator to the first actuator shaft and connecting a second actuator to the second actuator shaft, wherein the rotating of the first actuator shaft is carried out by the first actuator, and the rotating of the second actuator shaft is carried out by the second actuator, and
 providing first and second position sensors associated with the respective first and second actuator shafts, wherein the position sensors are connected to a controller and the actuators are connected to the controller, and the controller adjusts a position of the first and second valve bodies independently,
 wherein the thermal management valve is connected to a coolant system in a motor vehicle, and the controller adjusts the position of the first valve body and the second valve body in order to separately control coolant flows from the thermal management valve.

14. The method of claim 13, wherein the first or second valve body is formed as a spheroid body.

* * * * *